United States Patent
Kelm et al.

(10) Patent No.: US 9,042,618 B2
(45) Date of Patent: May 26, 2015

(54) METHOD AND SYSTEM FOR DETECTION 3D SPINAL GEOMETRY USING ITERATED MARGINAL SPACE LEARNING

(75) Inventors: Michael Kelm, Erlangen (DE); Shaohua Kevin Zhou, Plainsboro, NJ (US); Yefeng Zheng, Dayton, NJ (US); Michael Suehling, Plainsboro, NJ (US)

(73) Assignee: Siemens Aktiengesellshaft, Munich (DE)

( * ) Notice: Subject to any disclaimer, the term of this patent is extended or adjusted under 35 U.S.C. 154(b) by 698 days.

(21) Appl. No.: 12/794,850

(22) Filed: Jun. 7, 2010

(65) Prior Publication Data

US 2011/0064291 A1    Mar. 17, 2011

Related U.S. Application Data

(60) Provisional application No. 61/243,313, filed on Sep. 17, 2009.

(51) Int. Cl.
  *G06K 9/00*    (2006.01)
  *G06T 7/00*    (2006.01)

(52) U.S. Cl.
  CPC ........ G06T 7/0087 (2013.01); *G06K 2209/055* (2013.01); *G06T 2207/20076* (2013.01); *G06T 2207/20081* (2013.01); *G06T 2207/30012* (2013.01)

(58) Field of Classification Search
  CPC .............. G06K 2209/055; G06T 2207/20076; G06T 2207/20081; G06T 2207/30012; G06T 7/0087; G06T 2207/10081; A61B 6/032

USPC .......................................................... 382/131
See application file for complete search history.

(56) References Cited

U.S. PATENT DOCUMENTS

| | | | |
|---|---|---|---|
| 7,095,881 B2 | 8/2006 | Lelong et al. | |
| 2007/0127799 A1 | 6/2007 | Reisman et al. | |
| 2008/0085050 A1 * | 4/2008 | Barbu et al. | 382/154 |
| 2008/0132784 A1 | 6/2008 | Porat et al. | |
| 2008/0240887 A1 | 10/2008 | Gotoh et al. | |
| 2010/0026637 A1 | 2/2010 | Lai | |

OTHER PUBLICATIONS

Schmidt, Stefan, et al., "Spine Detection and Labeling Using a Parts-Based Graphical Model", in Proc. IPMI, pp. 122-133, Jul. 2007.
Corso, Jason J., et al., "Lumbar Disc Localization and Labeling with a Probabilistic Model on both Pixel and Object Features", Med Image Comput Comput Assist Interv. 2008;11(Pt 1):202-10.
Pekar, Vladimir, et al., "Automated Planning of Scan Geometries in Spine MRI Scans", In Proc. MICCAI, pp. 601-608, Sep. 2007.
Ghebreab, Sennay, Te Al., "Combining Strings and Necklaces for Interactive Three-Dimensional Segmentation of Spinal Images Using an Integral Deformable Spine Model", IEEE Transactions on Biomedical Engineering, No. 10, vol. 51, pp. 1821-1829, Oct. 2004.

* cited by examiner

*Primary Examiner* — Hiep V Nguyen

(57) ABSTRACT

A method and apparatus for automatic detection and labeling of 3D spinal geometry is disclosed. Cervical, thoracic, and lumbar spine regions are detected in a 3D image. Intervertebral disk candidates are detected in each of the spine regions using iterative marginal space learning (MSL). Using a global probabilistic spine model, a separate one of the intervertebral disk candidates is selected for each of a plurality of labeled intervertebral disk locations.

25 Claims, 7 Drawing Sheets

FIG. 2B

Input: $R, N_0, N_{pos}, N_{ort}, N_{sca}$
Output: Set $\mathcal{D}$ of detected disk candidates
$\mathcal{D} := \{\}$;
252 → $\mathcal{P}_0 :=$ the $N_0$ most likely candidates according to the position detector;
repeat
254 →   $\mathcal{P}_0 := \{p \in \mathcal{P}_0 : d(p, q) > R \; \forall q \in \mathcal{D}\}$;
256 →   $\mathcal{D}_{pos} :=$ the $N_{pos}$ most likely candidates from $\mathcal{P}_0$;
258 →   $\mathcal{D}_{ort} :=$ the $N_{ort}$ most likely candidates from $\mathcal{D}_{pos}$ according to the orientation detector;
260 →   
262 →   $\mathcal{D}_{sca} :=$ the $N_{sca}$ most likely candidates from $\mathcal{D}_{ort}$ according to the scale detector;
        Perform hierarchical agglomerative clustering on $\mathcal{D}_{sca} \cup \mathcal{D}$;
        foreach *cluster C* do
264 →       if $|\mathcal{C}| \geq N_A$ then
                Aggregate the top $N_A$ candidates and add the resulting box to $\mathcal{D}$;
            end
        end
266 → until $|\mathcal{P}_0| = 0$ or $|\mathcal{D}|$ *remains constant*;

METHOD AND SYSTEM FOR DETECTION 3D SPINAL GEOMETRY USING ITERATED MARGINAL SPACE LEARNING

This application claims the benefit of U.S. Provisional Application No. 61/243,313, filed Sep. 17, 2009, the disclosure of which is herein incorporated by reference.

BACKGROUND OF THE INVENTION

The present invention relates to detection of 3D spinal geometry in images, and more particularly, to automated detection and labeling of 3D spinal disks in medical images using iterated marginal space learning.

Examinations of the vertebral column with both Magnetic Resonance (MR) and Computer Tomography (CT) require a standardized alignment of the scan geometry with the spine. While in MR, the intervertebral disks can be used to align slice groups to position saturated bands, in CT the reconstruction planes need to be aligned. In addition to the position and orientation of the disks, physicians are typically interested in labeling the disks (e.g., C2/C3, C5/T1, L1/L2 . . . ). Labeling the intervertebral disks allows one to quickly determine the anatomical location without error-prone counting. As manual alignment is both time consuming and operator dependent, it is desirable to have a robust, fully automatic, and thus reproducible approach for detecting and labeling spinal geometry.

An automatic procedure for extracting the spinal geometry faces various challenges, however. Varying contrasts and image artifacts can compromise the detection of intervertebral disks based on local image features. Thus, a global spinal model is required to robustly identify individual disks from their context. Such a model must also cope with missed detections and subjects with an unusual number of vertebrae. Further, the overall approach should run quickly to allow clinical application.

BRIEF SUMMARY OF THE INVENTION

The present invention provides a method and apparatus for automatic detection of spinal geometry in 3D images. Embodiments of the present invention combine efficient local object detection based on marginal space learning (MSL) with a global probabilistic model that incorporates pose priors on the nine dimensional parameter spaces that encode the position, orientation, and scale of the individual intervertebral disks. Embodiments of the present invention utilize a database-guided detection paradigm and can thus be easily trained for spine detection in computed tomography (CT) and magnetic resonance (MR) images acquired with different sequences.

In one embodiment of the present invention, intervertebral disk candidates are detected in a 3D image, such as a CT or MR image, using iterative marginal space learning (MSL). Using a global probabilistic spine model, a separate one of the intervertebral disk candidates is selected for each of a plurality of labeled intervertebral disk locations. Cervical, thoracic, and lumbar spine regions may be detected in the 3D image, and intervertebral disk candidates may be separately detected in each of the cervical, thoracic, and lumbar spine regions using iterative MSL.

In another embodiment of the present invention, in order to detect multiple similar anatomic objects in a 3D image, a set of initial position candidates is detected in the 3D image using a trained position detector. All position candidates close to any already detected objects are removed from the set of initial position candidates. A number of most likely position candidates are selected from the set of initial position candidates. Position-orientation candidates are detected in the 3D image based on the most likely position candidates using a trained position-orientation detector, and box candidates are detected in the 3D image based on the position-orientation candidates using a trained position-orientation-scale detector. The box candidates are clustered into one or more clusters and for each cluster with at least $N_A$ box candidates, an object is detected in the 3D image candidate by aggregating the top $N_A$ box candidates. These steps are repeated until no initial position candidates remain or no objects are detected.

These and other advantages of the invention will be apparent to those of ordinary skill in the art by reference to the following detailed description and the accompanying drawings.

BRIEF DESCRIPTION OF THE DRAWINGS

FIG. 2B illustrates pseudo code for implementing the method of FIG. 2A according to an embodiment of the present invention;

DETAILED DESCRIPTION

The present invention is directed to a method and apparatus for detecting 3D spinal geometry object in medical images, such as computed tomography (CT) or magnetic resonance (MR) images. Embodiments of the present invention are described herein to give a visual understanding of the anatomical object detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
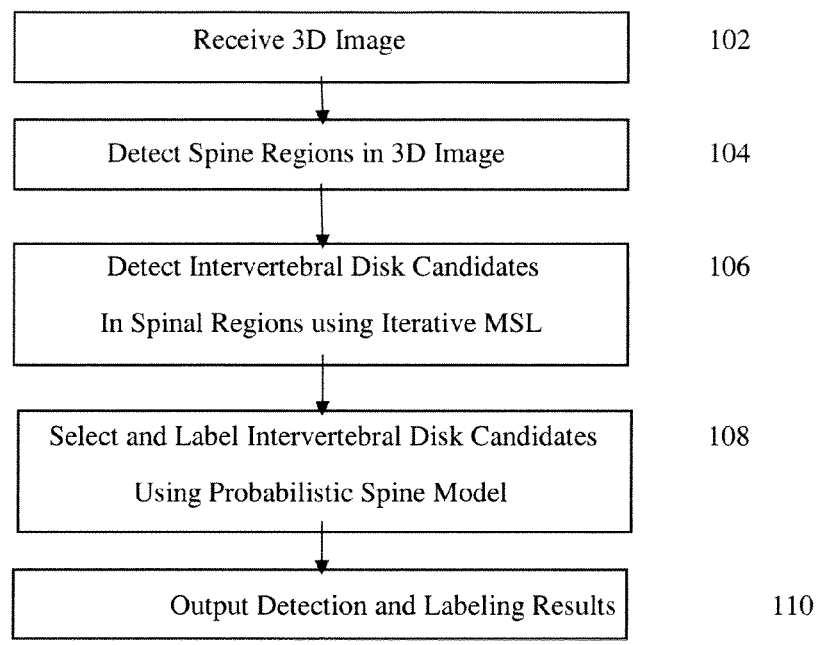
FIG. 1 illustrates a method for automatically detecting and labeling intervertebral disks in a 3D image according to an embodiment of the present invention.

FIG. 1 illustrates a method for automatically detecting and labeling intervertebral disks in a 3D image according to an embodiment of the present invention. The method of FIG. 1 transforms a 3D medical image representing a patient's anatomy to extract and label the patient's intervertebral disks form the 3D medical image. As illustrated at step 102, a medical image volume is received. For example, the medical image volume can be a CT volume or MRI volume, but the present invention is not limited thereto. The medical image volume can be received directly from an image acquisition device, such as a CT scanner or an MR scanner. It is also possible the medical image volume can be a previously scanned volume that is retrieved from a memory or storage of a computer system or a computer readable medium.

At step 104, one or more spinal regions are detected in the medical image volume. One or more spinal anatomy detectors are used to detect anatomical structures that can be found with high reliability and that provide rough information about the range of positions of the intervertebral disks. This may include detection of predefined anatomical slices that carry information on transversal positioning, particular landmarks such as the tip of the coccyx or the dense top of the axis (vertebra C2), distinguishable vertebrae such as the sacrum or the axis, or whole spine parts, such as the cervical spine, thoracic spine, and lumber spine. According to an advantageous implementation, separate detectors are used to detect cervical, thoracic, and lumbar spinal regions. This results in bounding boxes defining the cervical, thoracic and lumber spinal regions.

According to an embodiment of the present invention, all of the anatomy detectors (e.g., cervical, thoracic, and lumbar spinal region detectors) utilize the constrained marginal space learning (c-MSL) framework proposed in United States Published Patent Application No. 2009/0304251, which is incorporated herein by reference. c-MSL efficiently detects an oriented box around a target structure in an image volume by decomposing the nine-dimensional parameter estimation problem into three smaller parameter estimation problems using machine learning techniques. First, the $N_{pos}$ most likely position candidates (x, y, z) for the center of target structure are obtained using a position detector. Based on the position candidates, the $N_{ori}$ most likely position-orientation candidates (x, y, z, $\alpha$, $\beta$, $\gamma$) are obtained using a position-orientation detector. Finally, $N_{sca}$ box (position-orientation-scale) candidates (x, y, z, $\alpha$, $\beta$, $\gamma$, w, h, d) are obtained from a position-orientation-scale detector and aggregated to give a final estimate for a bounding box defining the target structure.

At step 106, intervertebral disk candidates are detected in each of the spinal regions using iterated marginal space learning. According to an advantageous implementation, three individual disk detectors are trained based on annotated training data, one for cervical disks, one for thoracic disks, and one for lumber disks. Since intervertebral disks in the lumber spine are typically bigger and have different orientations than the cervical or thoracic disks, separate detectors trained on each subset (cervical, thoracic, and lumbar) of intervertebral disks can be expected to be more accurate. On the other hand, summarizing disk types into the training of one detector for each disk type, instead of training a detector for every individual disk, saves computation time and increases the generalization performance of the trained detector.

Each of the cervical, thoracic, and lumbar intervertebral disk detectors includes a position detector, position-orientation detector, and position-orientation-scale detector, which are trained based on annotated training data. The position, position-orientation, and position-orientation-scale detectors are each a trained probabilistic machine learning classifier (e.g., trained using a probabilistic boosting tree (PBT)). The PBT classifier for the position detector can be trained using Haar-like features and the PBT classifiers for the position-orientation detector and the position-orientation-scale detector can be trained using steerable features. Each of the cervical, thoracic, and lumbar intervertebral disk detectors can utilize the c-MSL framework for detecting an individual intervertebral disk, in which the position detector in each of the cervical, thoracic, and lumbar detectors in constrained to the respective cervical, thoracic, and lumbar regions detected at step 104. However, MSL (and c-MSL) has been designed to detect a single, specific object. In the presence of multiple objects of the same type (e.g., intervertebral disks), c-MSL cannot be applied directly since the final aggregation step only yields an estimate for one box. Multiple box detections can be obtained by clustering the box candidates obtained from the position-orientation-scale detector and aggregating only the top candidates in each cluster. However, due to the global selection of top candidates before orientation and scale detection, less salient target objects (disks) would be missed.

To overcome these problems, iterative MSL is used to cope with multiple objects of the same type. Iterative MSL achieves a higher sensitivity than traditional MSL at moderate computational costs. According to an advantageous implementation, c-MSL with subsequent clustering and aggregation is iteratively applied. Starting with a large number of initial position candidates, those position candidates that are close to already detected objects are remove before passing the top $N_{pos}$ remaining position candidates to the orientation detector. The process terminates if either no initial position candidates are left or no new objects are detected.

Figure 2A:
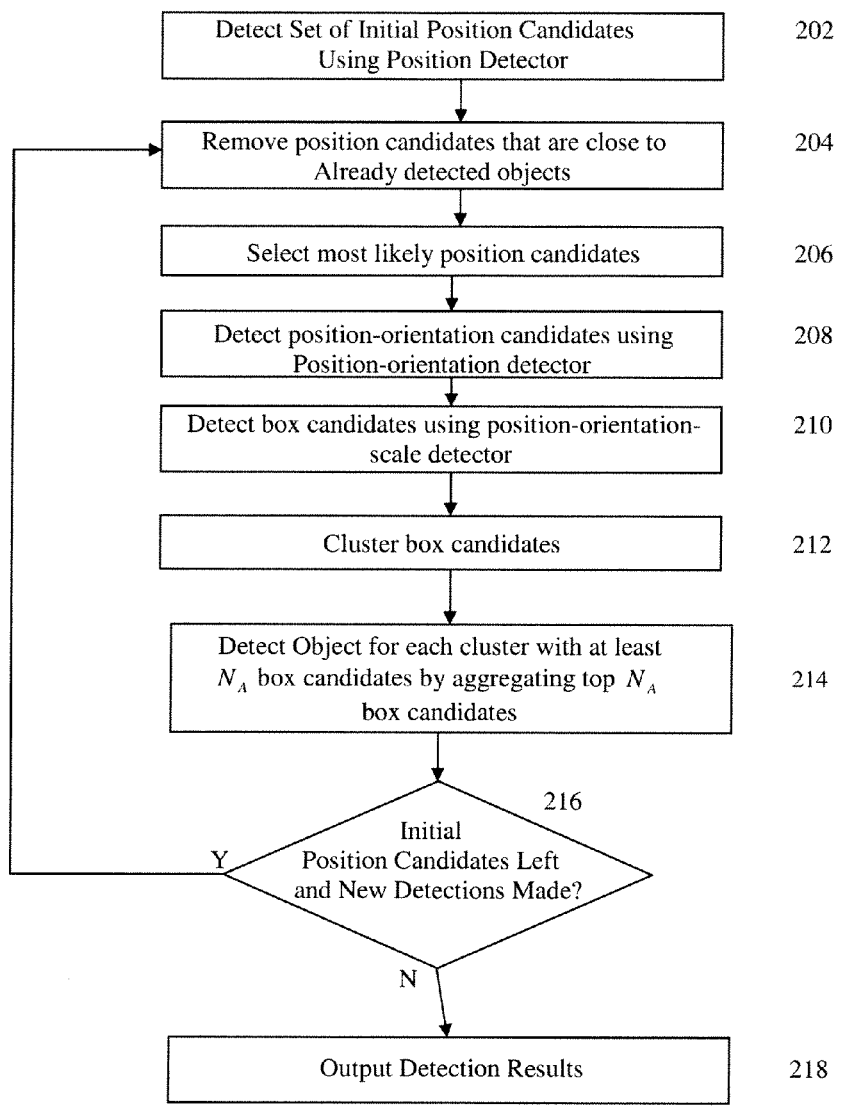
FIG. 2A illustrates a method for detecting multiple anatomic objects using iterative MSL according to an embodiment of the present invention.

FIG. 2A illustrates a method for detecting multiple anatomic objects using iterative MSL according to an embodiment of the present invention. The method of FIG. 2A can be used with each of the trained cervical, thoracic, and lumbar intervertebral disk detectors to detect multiple disk candidates in each of the cervical, thoracic, and lumber regions of the spine. Although the method is described herein as being used to detect intervertebral disks, it is to be understood that this method is not limited thereto and may be similarly used to detect other types of anatomical structures in medical images. Furthermore, although the embodiment describe herein utilizes c-MSL to constrain the position detectors, the method of FIG. 2A may also be used with traditional, unconstrained MSL as well. FIG. 2B illustrates pseudo code for implementing the method of FIG. 2A according to an embodiment of the present invention.

As illustrated in FIG. 2A, at step 202, the position detector is used to detect a set of initial position candidates. The position detector evaluates each voxel of a given region of the medical image volume. For example, the position detector of the cervical intervertebral disk detector can evaluate every voxel of the detected cervical spine region, the position detector of the thoracic intervertebral disk detector can evaluate every voxel of the detected thoracic spine region, and the position detector of the lumbar intervertebral disk detector can evaluate every voxel of the detected lumbar spine region. The position detector detects the $N_o$ most likely position candidates in order to obtain a set of initial position candidates $P_o$. Step 202 is shown at 252 of FIG. 2B.

At step 204, all position candidates close to any already detected objects are removed from the set of initial position candidates. For example, any position candidates for an intervertebral disk (cervical, thoracic, or lumbar) that are close to and already detected intervertebral disk candidate are removed from the set of initial disk candidates. In particular, any position candidates that are within a certain radius R of a center position of any already detected intervertebral disk candidates (the set D) are removed from the set of initial position candidates $P_o$, resulting in a filtered set of initial position candidates. It is to be understood that the set of detected intervertebral disk candidates is initially empty, and that in the first iteration of the method of FIG. 2A, no position candidates will be removed from the set of initial position candidates $P_o$. Step 204 of FIG. 2A is shown at 254 of FIG. 2B.

At step 206, the $N_{pos}$ most likely position candidates are selected from the filtered set of initial position candidates $P_o$. The $N_{pos}$ most likely position candidates are selected based on the probability score of the position detector used to detect the set of initial candidates $P_o$. The $N_{pos}$ most likely position candidates can be referred to as the set $D_{pos}$. According to an advantageous implementation, $N_{pos} < N_o$. Accordingly, at each iteration of the method, the best $N_{pos}$ remaining position candidates from the set of initial position candidates $P_o$ are used for disk candidate detection. Step 206 of FIG. 2A is shown at 256 of FIG. 2B.

At step 208, position-orientation candidates are detected based on the most likely position candidates using the trained position-orientation detector. In particular, position-orientation hypotheses are generated from the most likely position candidates, and the position-orientation detector detects $N_{ort}$ most likely position-orientation candidates $D_{ort}$. For example, the position-orientation detector of the cervical intervertebral disk detector detects a set of cervical intervertebral disk position-orientation candidates, the position-orientation detector of the thoracic intervertebral disk detector detects a set of thoracic intervertebral disk position-orientation candidates, and the position-orientation detector of the lumbar intervertebral disk detector detects a set of lumbar intervertebral disk position-orientation candidates. Step 208 of FIG. 2A is shown at 258 of FIG. 2B.

At step 210, box (position-orientation-scale) candidates are detected based on the most likely position-orientation candidates using the trained position-orientation-scale detector. In particular, position-orientation-scale hypotheses are generated from the most likely position-orientation candidates, and the position-orientation-scale detector detects $N_{sca}$ most likely box candidates $D_{sca}$. For example, the position-orientation-scale detector of the cervical intervertebral disk detector detects a set of cervical intervertebral disk box candidates, the position-orientation-scale detector of the thoracic intervertebral disk detector detects a set of thoracic intervertebral disk box candidates, and the position-orientation-scale detector of the lumbar intervertebral disk detector detects a set of lumbar intervertebral disk box candidates. Step 210 of FIG. 2A is shown at 260 of FIG. 2B.

At step 212, the box candidates are clustered. A clustering algorithm is used to obtain clusters of the box candidates. For example, according to a possible implementation, pairwise average-linkage clustering with Euclidean distance can be used as a clustering algorithm for clustering box candidates for intervertebral disks, but the present invention is not limited thereto. In this case, the clustering threshold can correspond to a minimum distance between intervertebral disks. Step 212 of FIG. 2A is shown at 262 of FIG. 2B.

At step 214, for each cluster with at least $N_A$ box candidates, detect a corresponding object by aggregating top $N_A$ box candidates. In particular, the $N_A$ most likely box candidates of each prominent cluster (cluster with at least $N_A$ candidates) are averaged, and the result is added to the set of detected objects D. This step results in a set of objects D that is updated with each iteration of the method. For example, this step may result in a set of cervical intervertebral disk candidates, a set of thoracic intervertebral disk candidates, and a set of lumbar intervertebral disk candidates. Step 214 of FIG. 2A is shown at 264 of FIG. 2B.

At step 216, it is determined if there are any initial position candidates left and new detections have been made in the current iteration. It can be determined if there are any initial position candidates left by determining whether the set of initial position candidates $P_o$ is empty. It can be determined if new detections have been made in the current iteration by comparing the number of detected objects currently in the set of detected objects D with a number of detected objects in the set of detected objects after the previous iteration. If there are remaining initial position candidates and new detections have been made in the current iteration, the method returns to step 204. If there are no remaining initial position candidates or no detections were made in the current iteration, the method proceeds to step 218. Accordingly, in order to detect candidates for each type of intervertebral disk (cervical, thoracic, and lumbar), steps 204-216 are repeated for each type of disk until no initial position candidates remain or no new disk candidates are detected. Step 216 of FIG. 2A is shown at 266 of FIG. 2B.

At step 218, the detected objects are output. For example, the detected objects can be output by displaying the detected objects on a display of a computer system. It is also possible that the detected objects be output by storing the detected objects, for example, in memory or storage of a computer system or on a computer readable medium. As described in greater detail below, cervical, thoracic, and lumbar disk candidates output at step 218 can be further processed using a probabilistic graphical spine model to order and label the disk candidates.

Returning to FIG. 1, at step 108, a global probabilistic spine model is used to select and label the detected cervical, thoracic, and lumbar disk candidates. As described above, a set of intervertebral disk candidates is obtained from each of the cervical, thoracic, and lumbar intervertebral disk detectors using iterated MSL. Besides some information about possibly being a cervical, thoracic, or lumbar disk, no labeling information is available for the disk candidates. According to an embodiment of the present invention, a probabilistic graphical spine model is utilized to select and label the disk candidates. The probabilistic graphical spine model exploits the regular spatial arrangement as well as orientation and scale priors as obtained from the annotated training data.

Figure 3:
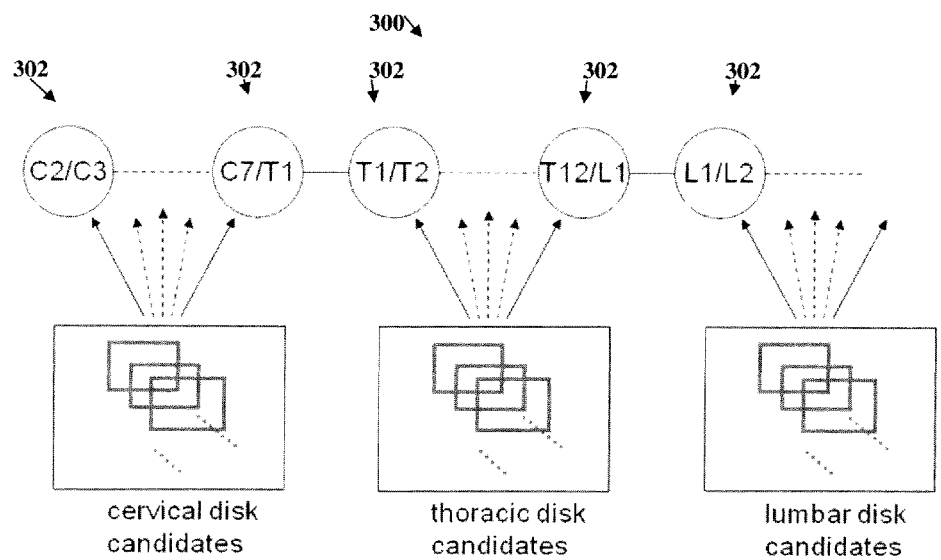
FIG. 3 illustrates a graphical model for intervertebral disk selection and labeling according to an embodiment of the present invention.

FIG. 3 illustrates a graphical model for intervertebral disk selection and labeling according to an embodiment of the present invention. As illustrated in FIG. 3, a chain-structured pair-wise and discrete graphical model 300 is defined where each variable 302 corresponds to one of the sought after intervertebral disk having a certain label (C2/C3 ... C7/T1, T1/T2 ... T12/L1, L1/L2 ... L5/S1). Each variable can take a value n between 1 and N indicating that disk candidate number n is the best selection for the corresponding intervertebral disk. A shown in FIG. 3, the cervical disk candidates are the possible selections for the intervertebral disks in the cervical region of the spine, the thoracic disk candidates are the possible selections for the intervertebral disks in the thoracic region of the spine, and the lumbar disk candidates are the possible selections for the intervertebral disks in the lumbar region of the spine.

The following potentials define the probabilistic model and capture relative position, relative orientation, and relative scale information of the intervertebral disk candidates. The penalty incurred by selecting a certain intervertebral disk candidate $b_s$ is defined by the site-potential:

$$V(b_s) = \log(Pr(b_s)), \quad (1)$$

where $Pr(b_s)$ is the probability provided by the corresponding intervertebral disk candidate detector (cervical, thoracic, or lumbar). Furthermore, for each neighboring pair of intervertebral disks a pair-potential is defined as:

$$V(b_s, b_t | \theta) = V_{pos} + V_{rot} + V_{sca} - \log Z, \quad (2)$$

where $$V_{pos} = -\frac{1}{2} d(b_s, b_t)^T D_{\sigma_{pos}}^{-1} d(b_s, b_t) \quad (3)$$

$$d(b_s, b_t) = R_s^T (p_t - p_s) - \mu_{pos}$$

$$V_{rot} = -\frac{\alpha (R_t R_s^{-1} R_\mu^{-1})^2}{2\sigma_{rot}^2} \quad (4)$$

$$V_{pos} = -\frac{1}{2} (s_t - s_s - \mu_{sca})^T D_{\sigma_{sca}}^{-1} (s_t - s_s - \mu_{sca}) \quad (5)$$

where $p_s$ is the position vector of intervertebral disk candidate $b_s$, $R_s$ is the rotation matrix of intervertebral disk candidate $b_s$ and $s_s$ is the scale vector of intervertebral disk candidate $b_s$. The function $\alpha(.)$ used for the rotation potential computes the amount of rotation. Such as function is described in greater detail in United States Published Patent Application No. 2009/0304251, which is incorporated herein by reference. $\theta$ represents pair-potential parameters of $\mu_{pos}$, $R_\mu$, $\mu_{sca}$ (mean relative position, orientation, scale) and $D_{\sigma_{pos}}$, $\sigma_{rot}$, $D_{\sigma_{sca}}$ (covariance of relative position, orientation, scale), which are estimated by maximum likelihood from the training data.

Neighboring variables (intervertebral disk locations) are enforced to select different disk candidates by defining:

$$V(b_s, b_t) = -\infty \text{ for } b_s = b_t. \quad (6)$$

In order to allow for missed intervertebral disk detections, and extra variable state representing a "missing" disk can be introduced. Missing penalties in the site-potential and pair-potential may be set such that suitable disk candidates are preferred over the "missing" disk state.

The iterated MSL method may result in more intervertebral disk candidates than actual disks. The correct disk candidates along with their labels are determined by maximizing the likelihood function obtained from the site-potentials and pair-potentials of all of the variables:

$$\log Pr(b_1, b_2, \ldots, b_N | \Theta, I) = \sum_s V_s(b_s | \theta_s, I) + \sum_{s \sim t} V_{st}(b_s, b_t | \theta_{st}) - A \quad (7)$$

This optimization may be performed using a marginal posterior mode estimate (MPME) or maximum a posteriori (MAP) estimate, which can be efficiently computed using belief propagation or other suitable algorithms. For MPME, the marginal distribution for each variable is determined and the box candidate with the highest probability is selected.

Returning to FIG. 1, at step 110 the labeled intervertebral disk detection results are output. For example, the labeled intervertebral disks can be output by displaying the labeled intervertebral disks on a display of a computer system. It is also possible that the labeled intervertebral disks be output by storing the detected intervertebral disks and corresponding labels, for example, in memory or storage of a computer system or on a computer readable medium.

Figure 4:
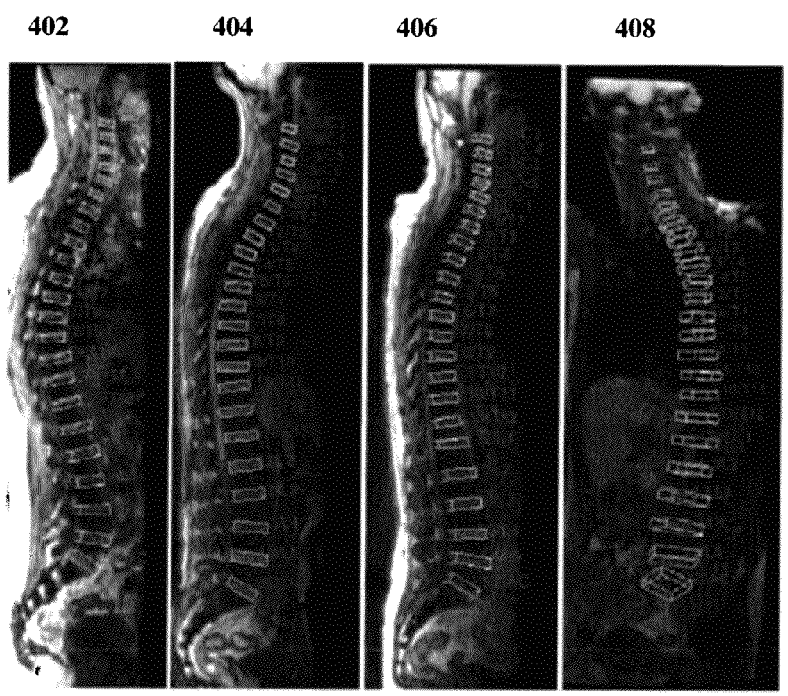
FIG. 4 illustrates exemplary intervertebral disk detection and labeling results in MR data.
Figure 5A:
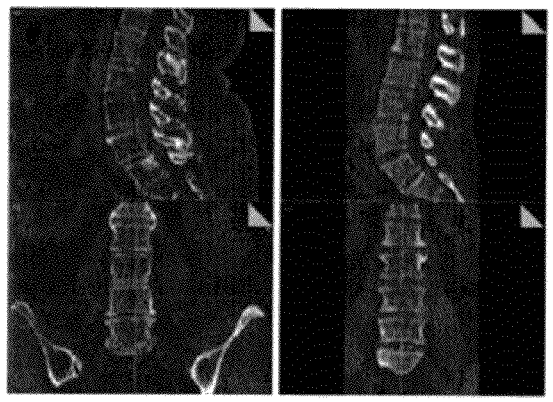
FIGS. 5A and 5B illustrate exemplary intervertebral disk detection and labeling results in CT data.
Figure 5B:
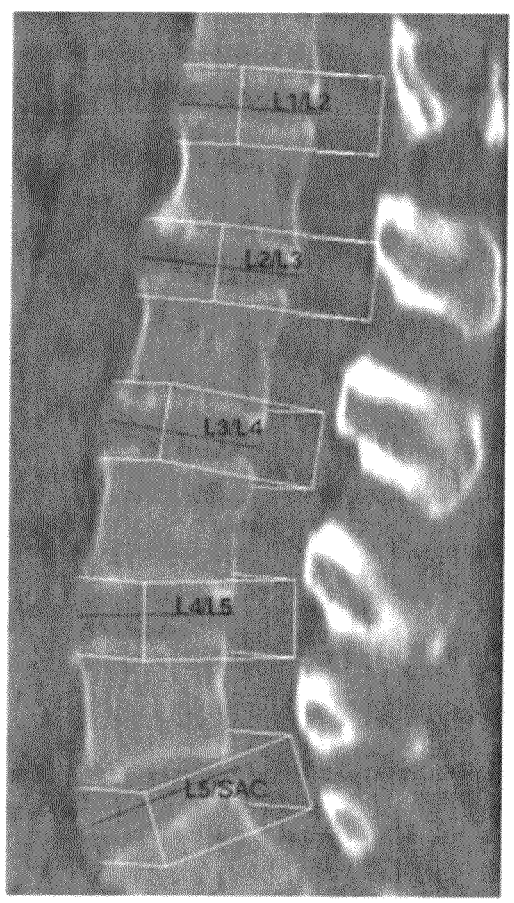

FIG. 4 illustrates exemplary intervertebral disk detection and labeling results in MR data. As illustrated in FIG. 4, images 402, 404, 406, and 408 are MR images showing detected intervertebral disks and corresponding labels obtained using the methods of FIG. 1. FIGS. 5A and 5B illustrate exemplary intervertebral disk detection and labeling results in CT data. As illustrated in FIG. 5A, images 502 and 504 show intervertebral disk detection results for lumbar spine CT scans using the method of FIG. 1. As illustrated in FIG. 5B, image 506 is a CT image showing detected intervertebral disks and corresponding labels obtained using the method of FIG. 1

Figure 6:
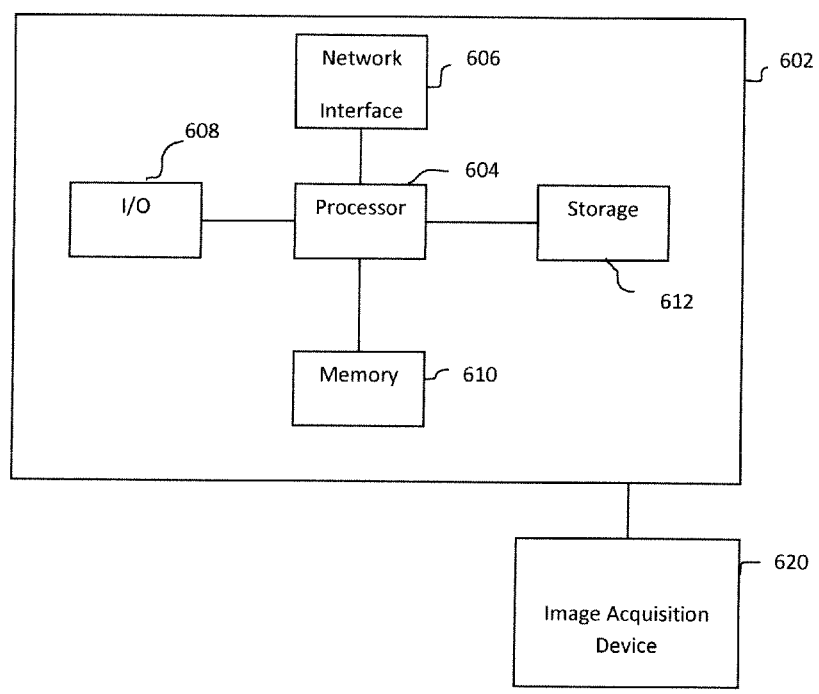
FIG. 6 is a high level block diagram of a computer capable of implementing the present invention.

The above-described methods for automatic detection and labeling of 3D spinal geometry may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612 (e.g., magnetic disk) and loaded into memory 610 when execution of the computer program instructions is desired. Thus, the steps of the methods of FIGS. 1, 2A, and 2B may be defined by the computer program instructions stored in the memory 610 and/or storage 612 and controlled by the processor 604 executing the computer program instructions. An image acquisition device 620, such as a CT scanning device, MRI scanning device, etc., can be connected to the computer 602 to input the 3D images (volumes) to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting and labeling intervertebral disks in a 3D image, comprising:
    detecting a plurality of intervertebral disk candidates in the 3D image using iterative marginal space learning, wherein a first one of a plurality of iterations of the iterative marginal space learning detects a shared set of initial position candidates and each subsequent one of the plurality of iterations of the iterative marginal space learning removes position candidates close to detected intervertebral disk candidates from the shared set of initial position candidates and selects a number of most likely position candidates from position candidates remaining in the shared set of initial position candidates; and
    selecting a separate one of the plurality of intervertebral disk candidates for each of a plurality of labeled intervertebral disk locations using a probabilistic spine model.

2. The method of claim 1, further comprising:
    detecting a cervical spine region, a thoracic spine region, and a lumbar spine region in the 3D image.

3. The method of claim 2, wherein said step of detecting a plurality of intervertebral disk candidates in the 3D image using iterative marginal space learning comprises:
    detecting a plurality of cervical intervertebral disk candidates with a trained cervical intervertebral disk detector using iterative marginal space learning constrained to the detected cervical spine region;
    detecting a plurality of thoracic intervertebral disk candidates with a trained thoracic intervertebral disk detector using iterative marginal space learning constrained to the detected thoracic spine region; and detecting a plurality of lumbar intervertebral disk candidates with a trained lumbar intervertebral disk detector using iterative marginal space learning constrained to the detected lumbar spine region.

4. The method of claim 3, wherein said step of selecting a separate one of the plurality of intervertebral disk candidates for each of a plurality of labeled intervertebral disk locations using a probabilistic spine model comprises:

selecting from the plurality of cervical disk candidates for labeled intervertebral disk locations in the cervical spine region;

selecting from the plurality of thoracic disk candidates for labeled intervertebral disk locations in the thoracic spine region; and selecting from the plurality of lumbar disk candidates for labeled intervertebral disk locations in the lumbar spine region.

5. The method of claim 1, wherein said step of detecting a plurality of intervertebral disk candidates in the 3D image using iterative marginal space learning comprises:

(a) detecting a set of initial position candidates using a trained position detector;

(b) removing all position candidates close to any already detected intervertebral disk candidate from the set of initial position candidates;

(c) selecting a number of most likely position candidates from the set of initial position candidates;

(d) detecting position-orientation candidates based on the most likely position candidates using a trained position-orientation detector;

(e) detecting box candidates based on the position-orientation candidates using a trained position-orientation-scale detector;

(f) clustering the box candidates into one or more clusters;

(g) for each cluster with at least $N_A$ box candidates, detecting an intervertebral disk candidate by aggregating the top $N_A$ box candidates; and (h) repeating steps (b)-(g) until at least one of no initial position candidates remain or no intervertebral disk candidates are detected.

6. The method of claim 1, wherein said step of selecting a separate one of the plurality of intervertebral disk candidates for each of a plurality of labeled intervertebral disk locations using a probabilistic spine model comprises:

optimizing the probabilistic spine model based on a site-potential of each of the plurality of intervertebral disk candidates and the pair-potential of neighboring pairs of the intervertebral disk candidates, wherein the site-potential is based on a probability determined by a trained intervertebral disk detector and the pair-potential is based on a spatial arrangement, orientation prior, and scale prior calculated based on annotated training data.

7. The method of claim 1, wherein said step of selecting a separate one of the plurality of intervertebral disk candidates for each of a plurality of labeled intervertebral disk locations using a probabilistic spine model comprises:

for each of the plurality of labeled intervertebral disk locations, selecting from the plurality of intervertebral disk candidates and a "missing" state.

8. The method of claim 1, wherein the 3D image comprises one of a 3D magnetic resonance (MR) image and a computed tomography (CT) image.

9. An apparatus for detecting and labeling intervertebral disks in a 3D image, comprising:

means for detecting a plurality of intervertebral disk candidates in the 3D image using iterative marginal space learning, wherein a first one of a plurality of iterations of the iterative marginal space learning detects a shared set of initial position candidates and each subsequent one of the plurality of iterations of the iterative marginal space learning removes position candidates close to detected intervertebral disk candidates from the shared set of initial position candidates and selects a number of most likely position candidates from position candidates remaining in the shared set of initial position candidates; and means for selecting a separate one of the plurality of intervertebral disk candidates for each of a plurality of labeled intervertebral disk locations using a probabilistic spine model.

10. The apparatus of claim 9, further comprising:

means for detecting a cervical spine region, a thoracic spine region, and a lumbar spine region in the 3D image.

11. The apparatus of claim 10, wherein said means for detecting a plurality of intervertebral disk candidates in the 3D image using iterative marginal space learning comprises:

means for detecting a plurality of cervical intervertebral disk candidates with a trained cervical intervertebral disk detector using iterative marginal space learning constrained to the detected cervical spine region;

means for detecting a plurality of thoracic intervertebral disk candidates with a trained thoracic intervertebral disk detector using iterative marginal space learning constrained to the detected thoracic spine region; and means for detecting a plurality of lumbar intervertebral disk candidates with a trained lumbar intervertebral disk detector using iterative marginal space learning constrained to the detected lumbar spine region.

12. The apparatus of claim 11, wherein said means for selecting a separate one of the plurality of intervertebral disk candidates for each of a plurality of labeled intervertebral disk locations using a probabilistic spine model comprises:

means for selecting from the plurality of cervical disk candidates for labeled intervertebral disk locations in the cervical spine region;

means for selecting from the plurality of thoracic disk candidates for labeled intervertebral disk locations in the thoracic spine region; and means for selecting from the plurality of lumbar disk candidates for labeled intervertebral disk locations in the lumbar spine region.

13. The apparatus of claim 9, wherein said means for detecting a plurality of intervertebral disk candidates in the 3D image using iterative marginal space learning comprises:

means for detecting a set of initial position candidates using a trained position detector;

means for removing all position candidates close to any already detected intervertebral disk candidate from the set of initial position candidates;

means for selecting a number of most likely position candidates from the set of initial position candidates;

means for detecting position-orientation candidates based on the most likely position candidates using a trained position-orientation detector;

means for detecting box candidates based on the position-orientation candidates using a trained position-orientation-scale detector;

means for clustering the box candidates into one or more clusters;

means for aggregating the top $N_A$ box candidates of each cluster with at least $N_A$ box candidates to detect an intervertebral disk candidate corresponding to each cluster with at least $N_A$ box candidates; and means for determining whether at least one of no initial position candidates remain or no intervertebral disk candidates are detected.

14. The apparatus of claim 9, wherein said means for selecting a separate one of the plurality of intervertebral disk candidates for each of a plurality of labeled intervertebral disk locations using a probabilistic spine model comprises:
    means for optimizing the probabilistic spine model based on a site-potential of each of the plurality of intervertebral disk candidates and the pair-potential of neighboring pairs of the intervertebral disk candidates, wherein the site-potential is based on a probability determined by a trained intervertebral disk detector and the pair-potential is based on a spatial arrangement, orientation prior, and scale prior calculated based on annotated training data.

15. The apparatus of claim 9, wherein said means for selecting a separate one of the plurality of intervertebral disk candidates for each of a plurality of labeled intervertebral disk locations using a probabilistic spine model comprises:
    means for selecting from the plurality of intervertebral disk candidates and a "missing" state for each of the plurality of labeled intervertebral disk locations.

16. A non-transitory computer readable medium encoded with computer executable instructions for detecting and labeling intervertebral disks in a 3D image, the computer executable instructions defining steps comprising:
    detecting a plurality of intervertebral disk candidates in the 3D image using iterative marginal space learning, wherein a first one of a plurality of iterations of the iterative marginal space learning detects a shared set of initial position candidates and each subsequent one of the plurality of iterations of the iterative marginal space learning removes position candidates close to detected intervertebral disk candidates from the shared set of initial position candidates and selects a number of most likely position candidates from position candidates remaining in the shared set of initial position candidates; and
    selecting a separate one of the plurality of intervertebral disk candidates for each of a plurality of labeled intervertebral disk locations using a probabilistic spine model.

17. The computer readable medium of claim 16, further comprising computer executable instructions defining the step of:
    detecting a cervical spine region, a thoracic spine region, and a lumbar spine region in the 3D image.

18. The computer readable medium of claim 17, wherein the computer executable instructions defining the step of detecting a plurality of intervertebral disk candidates in the 3D image using iterative marginal space learning comprise computer executable instructions defining the steps of:
    detecting a plurality of cervical intervertebral disk candidates with a trained cervical intervertebral disk detector using iterative marginal space learning constrained to the detected cervical spine region;
    detecting a plurality of thoracic intervertebral disk candidates with a trained thoracic intervertebral disk detector using iterative marginal space learning constrained to the detected thoracic spine region; and
    detecting a plurality of lumbar intervertebral disk candidates with a trained lumbar intervertebral disk detector using iterative marginal space learning constrained to the detected lumbar spine region.

19. The computer readable medium of claim 18, wherein the computer executable instructions defining the step of selecting a separate one of the plurality of intervertebral disk candidates for each of a plurality of labeled intervertebral disk locations using a probabilistic spine model comprise computer executable instructions defining the steps of:
    selecting from the plurality of cervical disk candidates for labeled intervertebral disk locations in the cervical spine region;
    selecting from the plurality of thoracic disk candidates for labeled intervertebral disk locations in the thoracic spine region; and
    selecting from the plurality of lumbar disk candidates for labeled intervertebral disk locations in the lumbar spine region.

20. The computer readable medium of claim 16, wherein the computer executable instructions defining the step of detecting a plurality of intervertebral disk candidates in the 3D image using iterative marginal space learning comprise computer executable instructions defining the steps of:
    (a) detecting a set of initial position candidates using a trained position detector;
    (b) removing all position candidates close to any already detected intervertebral disk candidate from the set of initial position candidates;
    (c) selecting a number of most likely position candidates from the set of initial position candidates;
    (d) detecting position-orientation candidates based on the most likely position candidates using a trained position-orientation detector;
    (e) detecting box candidates based on the position-orientation candidates using a trained position-orientation-scale detector;
    (f) clustering the box candidates into one or more clusters;
    (g) for each cluster with at least $N_A$ box candidates, detecting an intervertebral disk candidate by aggregating the top $N_A$ box candidates; and
    (h) repeating steps (b)-(g) until at least one of no initial position candidates remain or no intervertebral disk candidates are detected.

21. The computer readable medium of claim 16, wherein the computer executable instructions defining the step of selecting a separate one of the plurality of intervertebral disk candidates for each of a plurality of labeled intervertebral disk locations using a probabilistic spine model comprise computer executable instructions defining the step of:
    optimizing the probabilistic spine model based on a site-potential of each of the plurality of intervertebral disk candidates and the pair-potential of neighboring pairs of the intervertebral disk candidates, wherein the site-potential is based on a probability determined by a trained intervertebral disk detector and the pair-potential is based on a spatial arrangement, orientation prior, and scale prior calculated based on annotated training data.

22. The computer readable medium of claim 16, wherein the computer executable instructions defining the step of selecting a separate one of the plurality of intervertebral disk candidates for each of a plurality of labeled intervertebral disk locations using a probabilistic spine model comprise computer executable instructions defining the step of:
    for each of the plurality of labeled intervertebral disk locations selecting from the plurality of intervertebral disk candidates and a "missing" state.

23. A method for detecting multiple similar anatomical objects in a 3D image comprising:
    (a) detecting a set of initial position candidates for the anatomical objects in the 3D image using a trained position detector;

(b) removing all position candidates close to any already detected anatomical object from the set of initial position candidates;
(c) selecting a number of most likely position candidates from the set of initial position candidates;
(d) detecting position-orientation candidates for the anatomical objects in the 3D image based on the most likely position candidates using a trained position-orientation detector;
(e) detecting box candidates for the anatomical objects in the 3D image based on the position-orientation candidates using a trained position-orientation-scale detector;
(f) clustering the box candidates into one or more clusters;
(g) for each cluster with at least $N_A$ box candidates, detecting an anatomical object in the 3D image candidate by aggregating the top $N_A$ box candidates; and
(h) repeating steps (b)-(g) until at least one of no initial position candidates remain or no anatomical objects are detected.

24. The method of claim 23, wherein said step of detecting a set of initial position candidates for the anatomical objects in the 3D image using a trained position detector comprises:
detecting the set of initial position candidates in a constrained region of the 3D image.

25. The method of claim 23, wherein the trained position detector is trained based on annotated training data using a probabilistic boosting tree (PBT) and Haar-like features, the position-orientation detector is trained based on annotated training data using PBT and steerable features, and the position-orientation-scale detector is trained based on annotated training data using PBT and steerable features.

* * * * *